(12) United States Patent
Gaskill et al.

(10) Patent No.: US 6,954,890 B2
(45) Date of Patent: Oct. 11, 2005

(54) SYSTEM AND METHOD FOR INCREASING CAPACITY IN A NOISY COMMUNICATION ENVIRONMENT

(75) Inventors: Garold G. Gaskill, Tualatin, OR (US); Sherman L. Gavette, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 456 days.

(21) Appl. No.: 10/256,555

(22) Filed: Sep. 26, 2002

(65) Prior Publication Data

US 2004/0064775 A1 Apr. 1, 2004

(51) Int. Cl.$^7$ ............................................... H04L 1/18
(52) U.S. Cl. ........................................................ 714/749
(58) Field of Search .......................... 714/18, 748–749, 714/746; 340/310.01, 538; 370/280, 329

(56) References Cited

U.S. PATENT DOCUMENTS

| | | | | |
|---|---|---|---|---|
| 4,479,215 A | * | 10/1984 | Baker | 714/749 |
| 5,487,068 A | | 1/1996 | Smolinske et al. | 370/94.1 |
| 5,963,559 A | * | 10/1999 | Ohki | 370/445 |
| 6,081,568 A | | 6/2000 | Oda | 375/358 |
| 6,178,448 B1 | | 1/2001 | Gray et al. | 709/224 |

FOREIGN PATENT DOCUMENTS

| | | | | |
|---|---|---|---|---|
| JP | | 61239748 | 10/1986 | H04L/11/08 |
| JP | | 7264232 | 10/1995 | H04L/12/44 |
| WO | WO 00/60799 | | 10/2000 | H04L/1/18 |

OTHER PUBLICATIONS

Onunga et al., A simple packet retransmission strategy for throughput and delay enhancenet on power line communication channels, Jul. 1993, IEEE Trans. on power delivery, vol. 8, No. 3, p. 818–826.*

Onunga et al., Performance analysis of CSMA with priority acknowledgments (CSMA/PA) on noisy data networks with finite us population, Jul. 1991, IEEE Trans. on Comm., vol. 39, No. 7, p. 1088–1096.*

Kessler et al., Splitting algorithms in noisy channels with memory, 1989, IEEE, p. 136–142.*

* cited by examiner

Primary Examiner—Shelly Chase
(74) Attorney, Agent, or Firm—David C. Ripma; Joseph P. Curtin

(57) ABSTRACT

A system and method are provided for a transmitter to delay message retransmission in a noise environment, where a communications network uses a shared channel. The method comprises: transmitting a message on a shared channel, such as a ac powerline medium; failing to receive a received message acknowledgement; deciding that the transmission error is due to a noise; postponing the retransmission of the message; and, following the channel noise transmission error decision, releasing the channel for use by other transmitters. Deciding that the transmission error is due to channel noise includes: monitoring received signals; and, distinguishing between transmission collisions and noise. Postponing the retransmission of the message includes: measuring noise characteristics; estimating the noise burst duration; retransmitting the message after 50% of the estimated duration; if no message acknowledgement is received, retransmitting the message after 90% of the estimated duration; and, retransmitting the message after 99% of the estimated duration.

24 Claims, 4 Drawing Sheets

SYSTEM AND METHOD FOR INCREASING CAPACITY IN A NOISY COMMUNICATION ENVIRONMENT

BACKGROUND OF THE INVENTION

1. Field of the Invention

This invention generally relates to network communication systems, and more particularly to systems operating on wired media such as powerline and phoneline, that permit shared channel access to other transmitters.

2. Description of the Related Art

Existing methods for reliability, in systems with large packet duration relative to the transmission delay, typically include the immediate repeating of a packet not received. In a system with random noise, where the probability of a packet failure is independent of previous packets results, this is a reasonable procedure. In systems with a dedicated channel, it is also reasonable to repeat the transmission of the same packet until it is successfully received, since attempting to transmit a different packet on the same path will have no better chance of success than the current packet.

There are systems where several transmitters contend for a single channel in the environment of bursty channel noise. For such a system, attempting an immediate retransmission, or even backing off for a short period of time, may not improve the chances of a successful transmission. Retransmissions attempted during a long burst of noise are as likely to fail as the initial transmission, wasting precious channel capacity. However, different transmitter/receiver pairs may not necessarily encounter the same noise burst, and some of these pairs may have a better chance of communicating a packet through than the pair that has just experienced a packet failure. Some existing carrier sense multiple access with collision avoidance (CSMA/CA) systems do delay transmissions as part of a random backoff procedure due to packet failure, assuming that the failure is due to a collision, where a collision is the simultaneous transmission by two or more devices. However, in systems where the noise bursts are long relative to the packet duration, this type of backoff procedure doesn't adequately address the problem.

In other conventional systems where the packet duration is small relative to the transmission delays (e.g., satellite communication systems), multiple packets can be sent before the transmitter receives an acknowledgement that the first packet has been received. Hence, these systems incorporate an inherent delay, which incidentally improves the reliability of any repeated transmission in bursty environments. However, in systems where the packet duration is large relative to the transmission delays, and the acknowledgement is coupled with the transmitted packet, the repeated transmission occurs immediately after the failed packet and prior to transmission of the next packet. In a bursty environment, this immediate repeat likely wastes channel capacity. Some existing CSMA/CA systems do delay transmissions as part of a random backoff procedure due to packet failure, based upon the presumption of a simultaneous transmission collision, but these systems do not distinguish between a collision with another packet and noise bursts. Prior to the advent of powerline networks, bursty channels have tended to be more prevalent in wireless packet networks. However, wireless packet networks have addressed this problem with other techniques, such as frequency hopping or wideband coding.

It would be advantageous if a system existed that permitted a transmitter to make a determination of whether its transmissions were failing due to a long burst of noise in the channel.

It would be advantageous if the above-mentioned transmitter could release the channel for use by other transmitters when it determines that a long burst of noise is present.

It would be advantageous if the above-mentioned transmitter could calculate a retransmission schedule to efficiently complete its transmission in the presence of a long burst of noise.

SUMMARY OF THE INVENTION

Conventional packet communication systems address the problem of collisions that occur between two packets simultaneously transmitted by different stations, but these systems do not distinguish between a collision with another packet and noise bursts. The present invention system does distinguish between packet collisions and noise bursts, and, in the case of noise bursts, delays the packet retransmission for a relatively large interval, compared to the packet duration, permitting the noise to subside. The present invention system provides fuller utilization of the channel capacity and does not waste bandwidth by retransmitting when there is a low probability of success. Alternately stated, the present invention system uses the reliability associated with repeated transmissions, but intelligently schedules these repeats to make for a more efficient use of the channel capacity.

Accordingly, a method is provided for a transmitter to delay message retransmission in a noise environment, where a communications network uses a shared channel. The method comprises: transmitting a message on a shared channel, such as a ac powerline medium; failing to receive a received message acknowledgement; deciding that the transmission error is due to a noise; postponing the retransmission of the message; and, following the channel noise transmission error decision, releasing the channel for use by other transmitters.

In some aspects of the method, transmitting a message on a shared channel includes transmitting a message with a message duration that is longer than the transmission path delay. Then, postponing the retransmission of the message includes waiting a duration of time that is longer than the packet duration. In other aspects, deciding that the transmission error is due to channel noise includes: monitoring received signals; and, distinguishing between transmission collisions and noise.

In some aspects, postponing the retransmission of the message includes: measuring communication medium noise characteristics; estimating the noise burst duration using the noise characteristics; retransmitting the message after 50% of the estimated duration has expired; if no message acknowledgement is received, retransmitting the message after 90% of the estimated duration has expired; and, if no message acknowledgement is received, retransmitting the message after 99% of the estimated duration has expired.

Additional aspects of the above-described method and a system for delaying message retransmission in a noise environment where a communications device uses a shared channel are provided below.

DETAILED DESCRIPTION OF THE PREFERRED EMBODIMENTS

Figure 1:
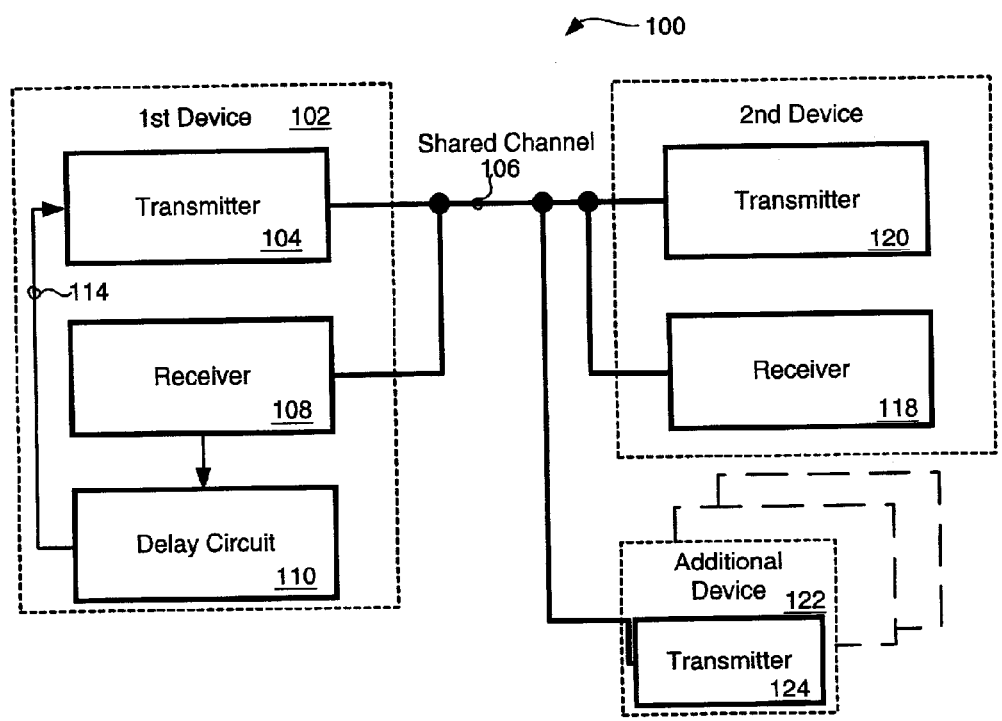
FIG. 1 is a schematic block diagram illustrating the present invention system for delaying message retransmission in a noise environment, with a communications network using a shared channel.

FIG. 1 is a schematic block diagram illustrating the present invention system for delaying message retransmission in a noise environment, with a communications network using a shared channel. The system 100 comprises a first device 102 including a transmitter 104 having a port connected to a shared communication channel 106, for transmitting a message. The first device 102 has a receiver 108 with a port connected to channel 106 to accept a received message acknowledgement. In some aspects of the system 100, the transmitter 104 and receiver 108 have ports connected to an ac powerline medium channel. This type of channel is prone to bursty noise. However, the system is not limited to just a powerline type of channel. The present invention could also be used with phoneline and wireless media, to name but a few examples.

The first device 102 also includes a delay circuit 110 having an input connected to the receiver 108 on line 112 to accept message acknowledgements and an output connected to the transmitter 104 on line 114 to postpone the retransmission of the message after deciding that a transmission error is due to communication channel noise.

A second device 116 includes a receiver 118 having a port connected to the channel 106 to accept transmitted messages from the first device transmitter 104. The second device 116 includes a transmitter 120 having a port connected to the channel 106 to transmit received message acknowledgements to the first device receiver 108.

In some aspects of the system 100, the first device transmitter 104 transmits a message having a first duration and the second device receiver 118 receives the message after transmission path delay of a second duration, where the second duration is less than the first duration. The first device delay circuit 110 orders the retransmission of the message after a delay having a duration longer than the first duration.

Typically, the system 100 may include a plurality of devices, each device having a transmitter. Shown is one additional device 122 having a transmitter 124 connected to the channel 106. However, the present invention system is not limited to any particular number of devices. As shown, the channel 106 is contentiously shared with the plurality of communication device transmitters 104/120/124. The first device delay circuit 110, following the channel noise transmission error decision, releases the channel 106 for use by other device transmitters 120/124.

Figure 2:
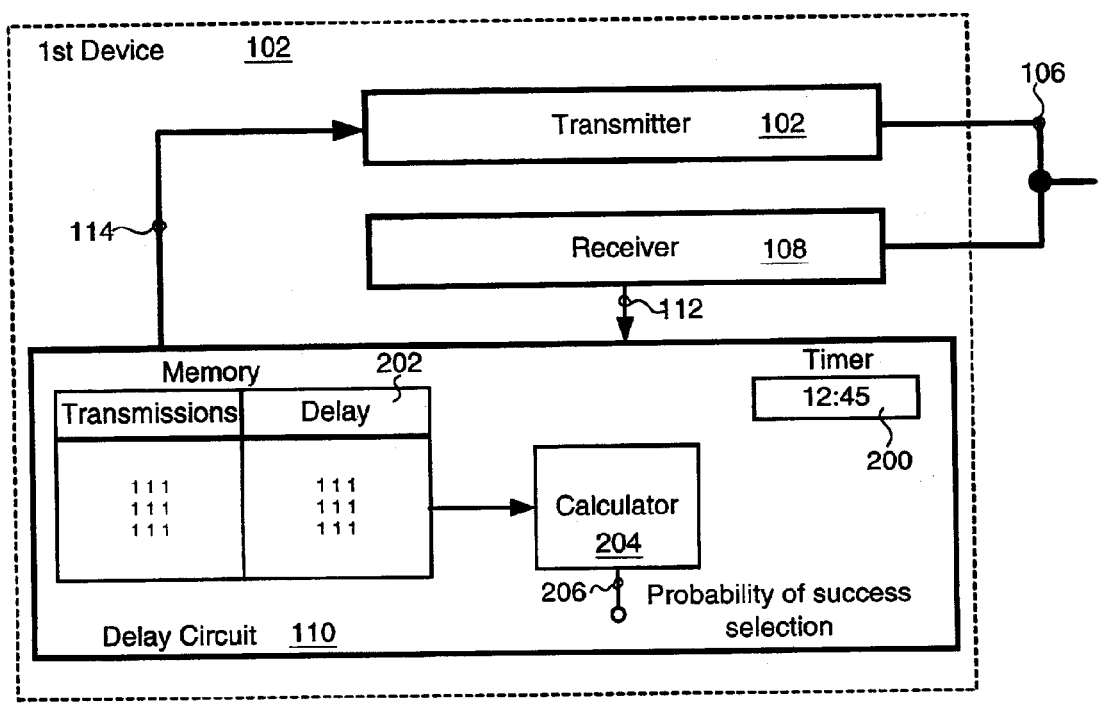
FIG. 2 is a schematic block diagram illustrating additional details of the first device of FIG. 1.

FIG. 2 is a schematic block diagram illustrating additional details of the first device 102 of FIG. 1. Although the following discussion specifically applies to the first device 102, the same description may apply to one or more other devices in the system of FIG. 1. As noted above, the transmitter 104 transmits a message having a message duration that is longer than transmission path delay. Further, the transmitter 104 transmits a packet having a packet duration that is responsive to the number of bytes in the message and the data rate. That is, the packet duration is extended in response to additional bytes in the message or a slower data rate. Typically, the packet duration is in the order of milliseconds (ms). Regardless, the delay circuit 110 postpones the retransmission a duration of time that is longer than the packet duration.

Typically, the transmitter 104 transmits a packet with a transmission path delay in the order of microseconds, while the delay circuit 110 postpones the retransmission of the message a length of time in the order of hundreds of milliseconds.

The delay circuit 110 has an input connected to the receiver 104 on line 112 to monitor received signals, to distinguish between transmission collisions and noise. In some aspects, a decision is made at the media access control (MAC) level concerning the existence of noise on the shared channel 106. The delay circuit 110 includes a virtual carrier sense timer 200. The delay circuit 110 sets the timer 200 to extended interframe space (EIFS) and scans for priority resolution symbol (PRS) symbols and delimiters after the transmission of a message a first time. The symbols and delimiters are associated with the acknowledgement that is expected after the transmission of a specific packet. The delay circuit 110 decides that noise is present in the channel if PRS symbols and delimiters are not detected after the transmission of the message a second time.

In another aspect of the device 102, a decision concerning the existence of noise is made at the physical layer of the device. The delay circuit 110 accepts communication medium noise characteristics from the receiver 108 on line 112 and estimates a noise burst duration in response to the noise characteristics. For example, the receiver 108 may provide an automatic gain control (AGC) voltage as a measure of activity in the receiver passband. The estimation of noise burst duration may be made, for example, on an analysis of maximums, attack, or a history of previous noise bursts. Many algorithms are known by those skilled in the art that could enable such an analysis. The delay circuit 110 orders the transmitter 104 to retransmit the message after 50% of the estimated duration has expired, if no message acknowledgement is received in response to the initial transmission. Then, the delay circuit 110 orders the retransmission of the message after 90% of the estimated duration has expired, if no message acknowledgement is received after the first retransmission. Finally, the delay circuit orders the retransmission of the message after 99% of the estimated duration has expired, if no message acknowledgement is received after the second retransmission. Other retransmissions schedules are possible. The present invention is not limited to a particular retransmission schedule or a particular number of retransmissions.

Alternately, the delay circuit 110 includes a memory 202 and a calculator 204. The delay circuit 110 makes a record of message retransmissions cross-referenced to delay intervals in the memory 300. The delay circuit 110 uses the calculator 204 to calculate the probability of successful retransmissions with respect to delay intervals. A desired probability of success is selected on line 206, and a delay is used resulting from the selected probability of success.

FUNCTIONAL DESCRIPTION

There has clearly been a need to improve the capacity, utilization, and quality of service of powerline networks where multiple nodes share the same physical channel. The present invention uses judicious timing of the retransmission of failed packets to increase the overall capacity of the system.

The noise characteristics of powerline networks have experimentally been found to be bursty in nature. Most of the packet errors are caused by a few bursts that are significantly larger than the packet size. While the causes and exact nature of the noise bursts are not exactly known, test results strongly suggest their existence and points to some general characteristics. The estimated frequency and duration of the bursts has been determined by measuring the packet failure rates of various packet durations and various numbers of sequential repeats. An appropriate packet repeat delay interval can be formulated from the frequency and duration of burst measured by experiment, or by an analysis of the carrier frequency before, during and after packet transmission.

The present invention is based upon the realization that packets are being lost, and channel capacity is being wasted by the conventional method of recovering from collisions. One convention network that could benefit from the application of the present invention is the powerline medium HomePlug. As has already been stated, the rapid retransmission of a failed packet does not result in a high success rate.

Conventional CSMA/CA systems such as HomePlug implement retransmission delays, but the intent of these retransmissions is recovery after the collision of simultaneous transmissions. In some extant systems, when a transmitter sends a packet and does not receive a response, it implements a backoff time approximating the duration of the maximum packet—presuming that the reason for the failure is simultaneous transmission collision of packets.

The present invention is able to:
1. distinguish between collisions and noise; and,
2. judiciously delay retransmissions depending upon the cause of the transmission failure.

In one aspect of the invention, the Physical Layer (PHY) is used to make the distinction between collisions and noise. For example, the device receiver can be used to monitor the signal before, during and after a packet transmission. Then, the characteristics of the monitored signals can be used to distinguish between collisions with other packets and with noise.

If PHY support is not available, the MAC layer can make an approximate distinction between collisions and noise using an algorithm such as the following HomePlug specific algorithm:
1. Transmit a first packet;
2. If no response delimiter is received in response to the first packet, set the Virtual Carrier Sense timer for EIFS (Extended Interframe Space) and scan for PRS symbols and or delimiters. This is conventional HomePlug V1.0 behavior;
3. If PRS symbols or delimiters are detected, then assume a collision and proceed as defined in V1.0. This is conventional HomePlug V1.0 behavior;
4. If no PRS symbols or delimiters are detected during the EIFS interval, V1.0 assumes that the channel is idle and the device immediately transmits the packet a second time. This is conventional HomePlug V1.0 behavior;
5. If this second packet is properly acknowledged with a response delimiter, then noise was not a factor in the delivery. This is conventional HomePlug V1.0 behavior; and,
6. If this second packet also goes unacknowledged, then assume that noise is present and initiate the delay mechanism. Conventional HomePlug V1.0 behavior would be to treat this as a collision and proceed as in step 2.

Figure 3A:
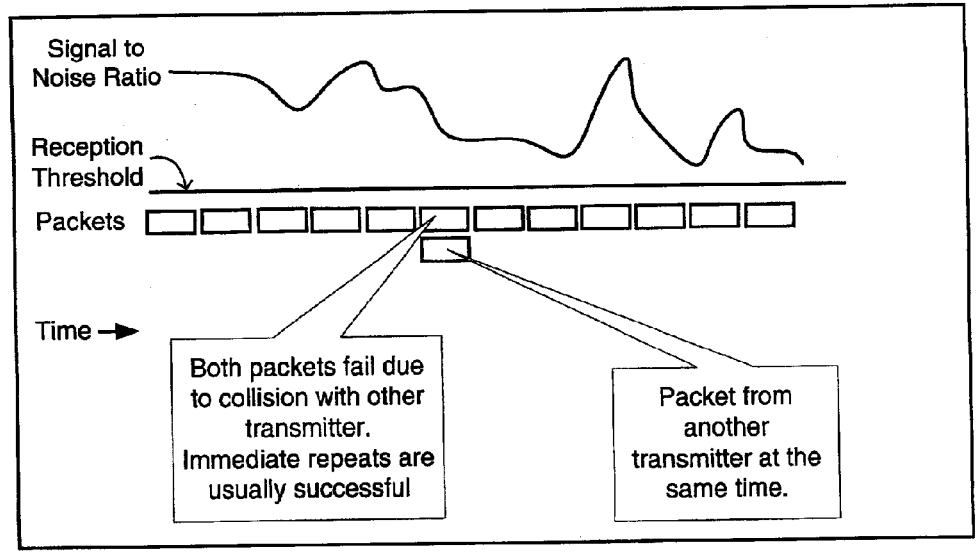
FIGS. 3a and 3b illustrate some scenarios where transmissions must contend with collisions and noise bursts on the channel.
Figure 3B:
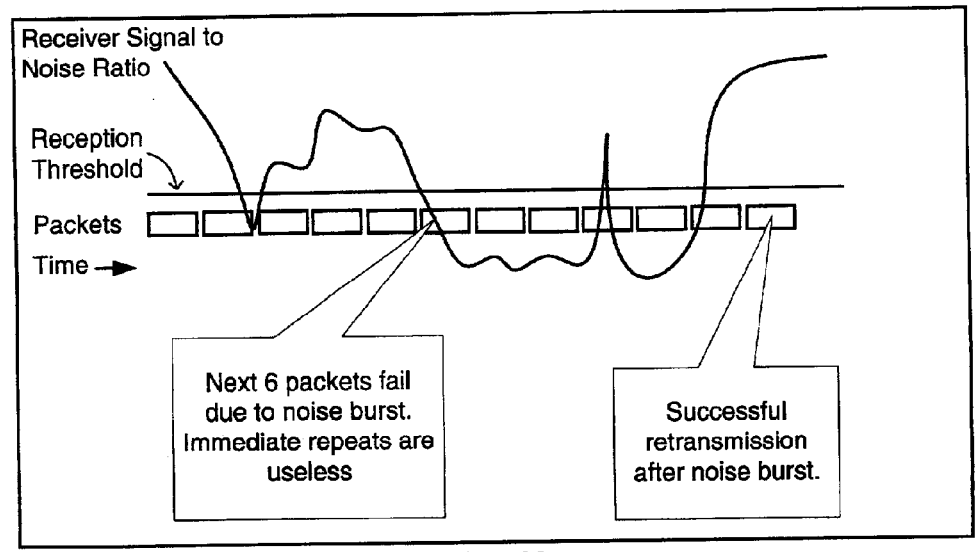

FIGS. 3a and 3b illustrate some scenarios where transmissions must contend with collisions and noise bursts on the channel. FIG. 3a illustrates a collision and immediate retransmission. The retransmission is successful because the initial failure is due to a collision, and not a long duration noise burst.

Once it has been determined that a packet transmission has failed because of noise, the second transmission of a packet could wait long enough to cover the duration of 50% of all noise bursts, while the third transmission might wait for long enough to cover 90 percent of all noise bursts, and a fourth transmission wait long enough to cover 99% of all noise bursts. If previous experimental results are used as a guide, a delay to the second packet transmission could be 8 ms (time for at least 5 packets on another link to be transmitted) after the first transmission, while the third packet could begin 32 ms (time for at least 20 packets), and the fourth and final transmission could be 128 ms later (time for 80 packets).

FIG. 3b is an example of a delay in the second transmission made in accordance with the present invention due to the presence of noise in the channel. The noise burst is long enough to destroy 5 packets. Since the second transmission is delayed 5 packets, the second transmission is made after the noise is gone, and the second transmission is successful.

As an alternative to a static mechanism described above, a heuristic mechanism is adopted in some aspects of the invention. For example, the device keeps a data record concerning the success and failure of packet retransmissions cross-referenced to delays. Then, delay intervals are optimized to balance delay vs. failure rate. The longer the delay in the retransmission, the better the chances of success. However, the total delay in delivering a packet must not exceed the maximum packet lifetime required by the application. The minimal delay required by an application clearly influences the delay intervals that must be used.

If one assumes a 1% residual packet error rate even after 16 re-transmissions, then the capacity wasted on an unsuccessful transmission is 1−(100/116)=~14%. Using the present invention, and assuming the second transmission is successful (best possible case), then the capacity gain would be 1−(101/116)=~13%.

Figure 4:
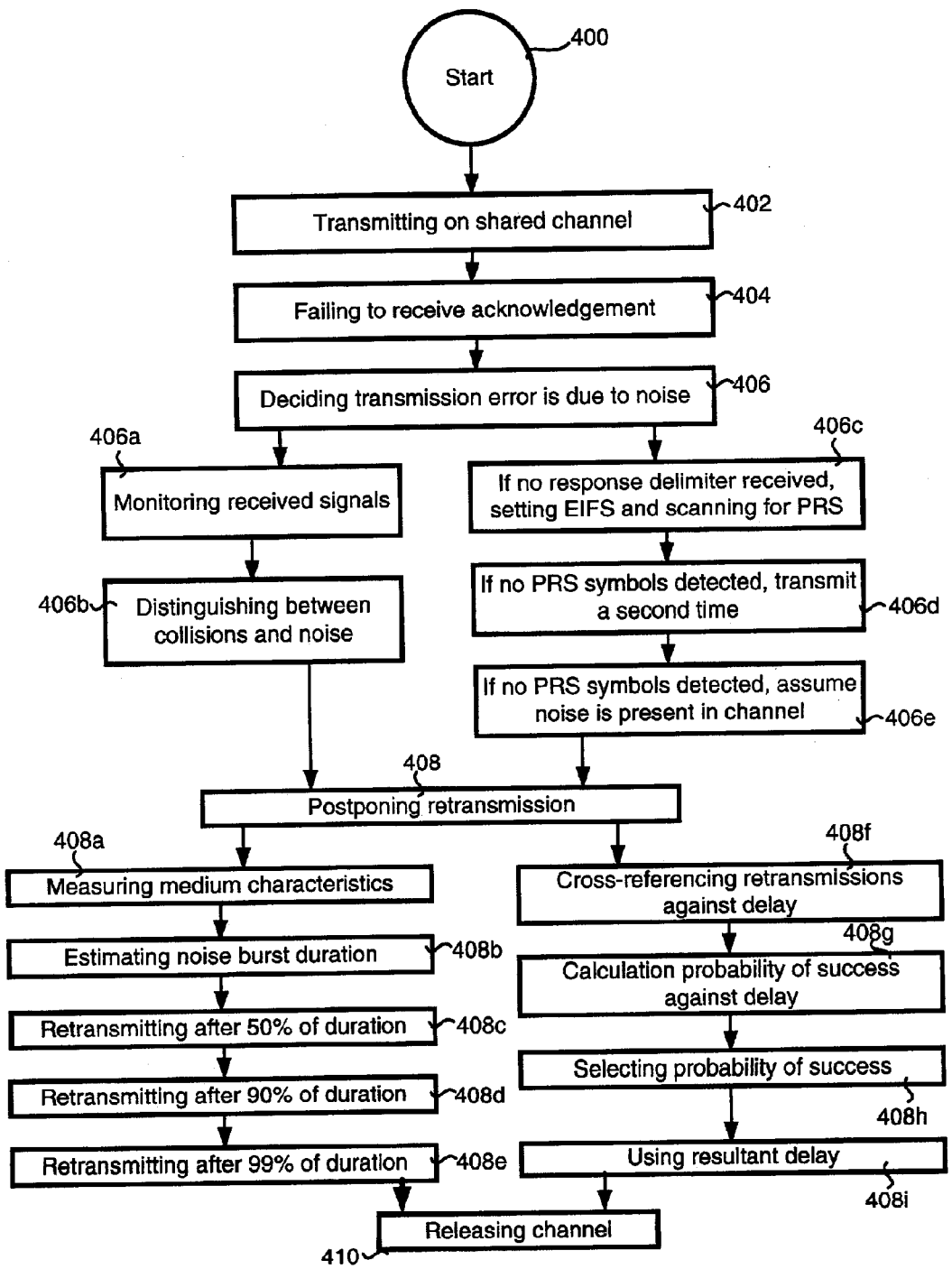
FIG. 4 is a flowchart illustrating the present invention method for a transmitter to delay message retransmission in a noise environment, with a communications network using a shared channel.

FIG. 4 is a flowchart illustrating the present invention method for a transmitter to delay message retransmission in a noise environment, with a communications network using a shared channel. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400.

Step 402 transmits a message on a shared channel. In some aspects, transmitting a message on a shared channel includes transmitting a message on an ac powerline medium. Step 404 fails to receive a received message acknowledgement. Step 406 decides that the transmission error is due to a noise. Step 408 postpones the retransmission of the message. In some aspects of the method, transmitting a message on a shared channel in Step 402 includes contentiously sharing the channel with other transmitters. Then, the method comprises a further step. Step 410, following the channel noise transmission error decision, releases the channel for use by other transmitters.

In some aspects, transmitting a message on a shared channel in Step 402 includes transmitting a message with a message duration that is longer than the transmission path delay. In other aspects, transmitting a message with a message duration that is longer than the transmission path delay includes transmitting a packet having a packet duration that is responsive to the number of bytes in the message and the message data rate. Then, postponing the retransmission of the message in Step 408 includes waiting a duration of time that is longer than the packet duration.

In another aspect of the method, transmitting a message on a shared channel in Step 402 includes transmitting a packet with a transmission path delay in the order of microseconds. Then, postponing the retransmission of the message in Step 408 includes waiting a length of time in the order of hundreds of milliseconds.

In other aspects of the method, deciding that the transmission error is due to channel noise in Step 406 includes substeps. Step 406*a* monitors received signals. Step 406*b* distinguishes between transmission collisions and noise.

Alternately, deciding that the transmission error is due to channel noise includes a different set of substeps. Step 406*c*, if no response delimiter is received in response to transmitting a packet a first time, sets the virtual carrier sense timer to extended interframe space (EIFS) and scans for priority resolution symbols (PRS) symbols and delimiters. Step 406*d*, if no PRS symbols and delimiters are detected, transmits the packet a second time. Step 406*e*, if no PRS symbols and delimiters are detected in response to transmitting the packet a second time, assumes that noise is present in the channel.

In other aspects of the method, postponing the retransmission of the message in Step 408 includes substeps. Step 408*a* measures communication medium noise characteristics. Step 408*b* estimates the noise burst duration using the noise characteristics. Step 408*c* retransmits the message after 50% of the estimated duration has expired. Step 408*d*, if no message acknowledgement is received, retransmits the message after 90% of the estimated duration has expired. Step 408*e*, if no message acknowledgement is received, retransmits the message after 99% of the estimated duration has expired.

Alternately, postponing the retransmission of the message in Step 408 includes different substeps. Step 408*f* makes a record of message retransmissions cross-referenced to delay intervals. Step 408*g* calculates the probability of successful retransmissions with respect to delay intervals. Step 408*h* selects a desired probability of success. Step 408*i* uses a delay resulting from the selected probability of success.

A system and method have been provided for improving the efficiency of packet communications on a shared channel, where relatively long duration noise bursts can occur. A few examples have been given as to how the present invention can be implemented, however, the invention is not limited to merely these examples. Other embodiments of the invention might include the release of contention free access prior to initiating the delay when a noise burst is detected, thus freeing the channel for use by others. The channel would be free normally in any event, but overtly freeing it could provide incremental increased capacity.

Other variations and embodiments of the invention will occur to those skilled in the art.

We claim:

1. In a communications network using a shared channel, a method for a transmitter to delay message retransmission in a noise environment, the method comprising:

transmitting a message on a shared channel with a message duration that is longer than the transmission path delay, the message including a packet having a packet duration that is responsive to the number of bytes in the message and the message data rate;

failing to receive a received message acknowledgement;

deciding that a transmission error is due to a noise; and, postponing the retransmission of the message.

2. The method of claim 1 wherein transmitting a message on a shared channel includes contentiously sharing the channel with other transmitters; and, the method further comprising:

following the channel noise transmission error decision, releasing the channel for use by other transmitters.

3. The method of claim 1 where postponing the retransmission of the message includes waiting a duration of time that is longer than the packet duration.

4. The method of claim 3 wherein transmitting a message on a shared channel includes transmitting a packet with a transmission path delay in the order of microseconds; and, wherein postponing the retransmission of the message includes waiting a length of time in the order of hundreds of milliseconds.

5. The method of claim 1 wherein transmitting a message on a shared channel includes transmitting a message on an ac powerline medium.

6. The method of claim 1 wherein deciding that the transmission error is due to channel noise includes:

monitoring received signals; and, distinguishing between transmission collisions and noise.

7. The method of claim 1 wherein deciding that a transmission error is due to channel noise includes:

if no response delimiter is received in response to transmitting a packet a first time, setting a virtual carrier sense timer to extended interframe space (EIFS) and scanning for priority resolution symbols (PRS) symbols and delimiters;

if no PRS symbols and delimiters are detected, transmitting the packet a second time; and, if no PRS symbols and delimiters are detected in response to transmitting the packet a second time, assuming that noise is present in the channel.

8. The method of claim 1 wherein postponing the retransmission of the message includes:

measuring communication medium noise characteristics;

estimating the noise burst duration using the noise characteristics;

retransmitting the message after 50% of the estimated duration has expired;

if no message acknowledgement is received, retransmitting the message after 90% of the estimated duration has expired; and, if no message acknowledgement is received, retransmitting the message after 99% of the estimated duration has expired.

9. The method of claim 1 wherein postponing the retransmission of the message includes:

making a record of message retransmissions cross-referenced to delay intervals;

calculating the probability of successful retransmissions with respect to delay intervals;

selecting a desired probability of success; and, using a delay resulting from the selected probability of success.

10. In a communications device using a shared channel, a system for delaying message retransmission in a noise environment, the system comprising:

a transmitter having a port connected to a shared channel to transmit a message;

a receiver having a port connected to the shared channel to accept a received message acknowledgement; and, a delay circuit having an input connected to the receiver to accept message acknowledgements and an output connected to the transmitter to postpone the retransmission of the message after deciding that a transmission error is due to noise in the channel.

11. The system of claim 10 wherein the transmitter port is connected to a channel that is contentiously shared with other communication device transmitters; and, wherein the delay unit, following the channel noise transmission error decision, releases the channel for use by other communication device transmitters.

12. The system of claim 10 wherein the transmitter transmits a message having a message duration that is longer than transmission path delay.

13. The system the of claim 12 wherein the transmitter transmits a packet having a packet duration that is responsive to the number of bytes in the message and the data rate.

14. The system of claim 13 wherein the delay circuit postpones the retransmission a duration of time that is longer than the packet duration.

15. The system of claim 14 wherein the transmitter transmits a packet with a transmission path delay in the order of microseconds; and, wherein the delay circuit postpones the retransmission of the message a length of time in the order of hundreds of milliseconds.

16. The system of claim 10 wherein the transmitter and receiver have ports connected to an ac powerline medium channel.

17. The system of claim 16 wherein the delay circuit has an input connected to the receiver to monitor received signals, and to distinguish between transmission collisions and noise.

18. The system of claim 16 wherein the delay circuit includes a virtual carrier sense timer, the delay circuit setting the timer to extended interframe space (EIFS) and scanning for priority resolution symbol (PRS) symbols and delimiters after the transmission of a message a first time; and, wherein the delay circuit decides that noise is present in the channel if PRS symbols and delimiters are not detected after the transmission of the message a second time.

19. The system of claim 10 wherein the delay circuit accepts measured communication medium noise characteristics from the receiver, estimates a noise burst duration in response to the nose characteristics, orders the retransmission of the message after 50% of the estimated duration has expired, if no message acknowledgement is received in response to the initial transmission, orders the retransmission of the message after 90% of the estimated duration has expired, if no message acknowledgement is received after the first retransmission, and orders the retransmission of the message after 99% of the estimated duration has expired, if no message acknowledgement is received after the second retransmission.

20. The system of claim 10 wherein the delay circuit includes a memory and a calculator, and wherein the delay circuit makes a record of message retransmissions cross-referenced to delay intervals in the memory, uses the calculator to calculate the probability of successful retransmissions with respect to delay intervals, and uses the delay resulting from a selected probability of success.

21. In a communications network using a shared channel, a system for delaying message retransmission in a noise environment, the system comprising:

a first device including:

a transmitter having a port to transmit a message;

a receiver having a port to accept a received message acknowledgement; and, a delay circuit having an input connected to the receiver to accept message acknowledgements and an output connected to the transmitter to postpone the retransmission of the message after deciding that a transmission error is due to communication channel noise;

a second device including:

a receiver having a port to accept transmitted messages from the first device transmitter; and, a transmitter having a port to transmit received message acknowledgements to the first device receiver; and, a shared communication channel connected to the transmitter and receiver ports of the first and second devices.

22. The system of claim 21 further comprising:

a plurality of devices, each device having a transmitter;

wherein the channel is contentiously shared with the plurality of communication device transmitters; and, wherein the first device delay circuit, following the channel noise transmission error decision, releases the channel for use by other device transmitters.

23. The system of claim 21 wherein the first device transmitter transmits a message having a first duration; and, wherein the second device receiver receives the message after transmission path delay of a second duration, where the second duration is less than the first duration.

24. The system of claim 23 wherein the first device delay circuit order the retransmission of the message after a delay having a duration longer than the first duration.

* * * * *